United States Patent

[11] 3,581,731

| [72] | Inventor | William M. Schulze |
| | | 104 South Ninth St., Minneapolis, Minn. 55402 |
| [21] | Appl. No. | 798,397 |
| [22] | Filed | Feb. 11, 1969 |
| [45] | Patented | June 1, 1971 |

[54] PORTABLE COOKING UNIT
7 Claims, 7 Drawing Figs.

[52] U.S. Cl. ...................................................... 126/25, 99/402, 99/422
[51] Int. Cl. ............................................................ A47j 37/00, F24b 3/00
[50] Field of Search .......................................... 126/9, 9 A, 25, 25 A, 39 M; 99/402, 422, 425

[56] References Cited
UNITED STATES PATENTS

| 2,021,915 | 11/1935 | Hancock et al. ............... | 126/25 |
| 2,161,669 | 6/1939 | Freeman ....................... | 126/25 |
| 2,752,846 | 7/1956 | Lucas ........................... | 99/422UX |
| 3,323,443 | 6/1967 | Schulze ........................ | 126/25X |
| 3,407,723 | 10/1968 | Varkala ....................... | 99/425X |

FOREIGN PATENTS

| 904,888 | 9/1962 | Great Britain ............... | 126/25 |

Primary Examiner—Charles J. Myhre
Attorney—Burd, Braddock & Bartz

ABSTRACT: A flameless combustion method of cooking and portable cooking unit designed to be fueled solely by crumpled paper sheet, such as newspaper. The unit includes an open top firebox. The walls of the firebox optionally have a limited number of small spaced-apart air vents adjacent the bottom to admit a limited amount of air to the firebox. A broiler rack fits over the top of the firebox to support the food to be cooked. The broiler rack has an essentially non-foraminous heat-conducting surface covering most of the top open area of the firebox to limit and control combustion of the paper fuel. A food and equipment storage chest is adapted to fit telescopically within the firebox. In one form the unit includes a double walled firebox. In this unit storage space is provided for the broiler rack and for fuel.

PATENTED JUN 1 1971 3,581,731

INVENTOR
WILLIAM M. SCHULZE

BY
Burd, Braddock & Bartz

ATTORNEYS

PATENTED JUN 1 1971 3,581,731

INVENTOR
WILLIAM M. SCHULZE
BY
*Burd, Braddock & Bartz*

ATTORNEYS

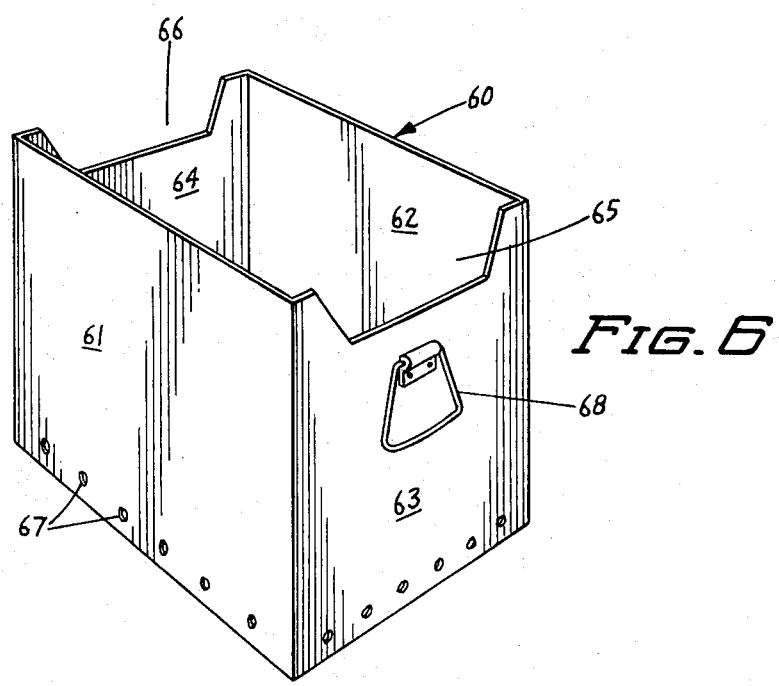
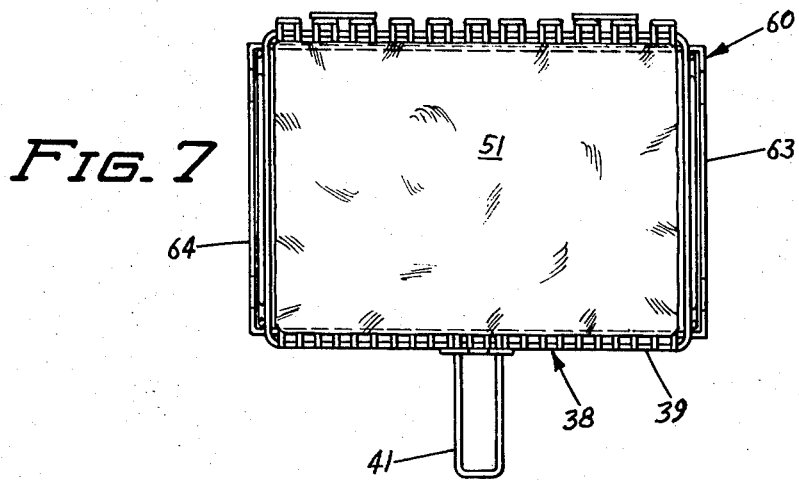

PORTABLE COOKING UNIT

This invention relates to a method of cooking and portable cooking unit, primarily for outdoor cooking. The unit is designed to be fueled solely by crumpled paper sheet, such as newspaper. The unit is designed to restrict and control the amount of air admitted to the firebox during cooking to permit combustion of the paper fuel, but without substantial propagation of flame.

Newspaper burning grills are not new. D.E.T. Davis U.S. Pat. No. 3,046,969 describes and claims such a grill. According to that patent, crumpled newspaper is the initial fuel. Thereafter, fat dropping from the meat being cooked, which almost immediately begins to fall, augments the newspaper fuel and the heat provided by the burning fat is sufficient to complete the cooking. Care must be taken not to overcrowd the top of the firebox in order to leave room for the heated air to escape readily from the top of the stove. The Davis grill is provided with air holes in the bottom wall of the firebox through which air enters as jets and blows up the flames. The droplets of fat from the meat being cooked burns somewhat fiercely in the jets of air.

Lijinsky and his associates at Chicago Medical School have investigated the possible production of carcinogenic polynuclear hydrocarbons in the charcoal broiling of foods. This work is reported in *Science*, volume 145, pages 53—55, July 3, 1964. The presence of the carcinogen benzo(a)pyrene to the extent of 8 micrograms per kilogram of steak has been found. The most likely source of the polynuclear hydrocarbons is the melted fat which drips on the hot coals and is pyrolyzed at the prevailing high temperatures. The polynuclear hydrocarbons in the smoke are then deposited on the meat as the smoke rises.

It has now been discovered that various viands including meats, fish, shellfish, etc. can be cooked over a newspaper fueled firebox in which the newspaper is burned in substantially flameless combustion due to limitation on the amount of air admitted. Since partial control of the air is achieved by use of a broiler rack having an essentially nonforaminous food supporting surface, drippings from the viands being cooked are not permitted to fall into the combustion zone, or, if they do fall on the fire, the food is shielded from the smoke. In this manner the production of carcinogens can be eliminated. If the viands are browned by direct short time exposure to the fire, the production of carcinogens can at least be substantially reduced.

The invention is illustrated in the accompanying drawings in which the same numerals are used to identify corresponding parts and in which:

FIg. 6 is a perspective view of an alternative form of firebox; and

FIG. 7 is a top plan view of the firebox of FIG. 6 with a rack or grate in place.

Figure 2:
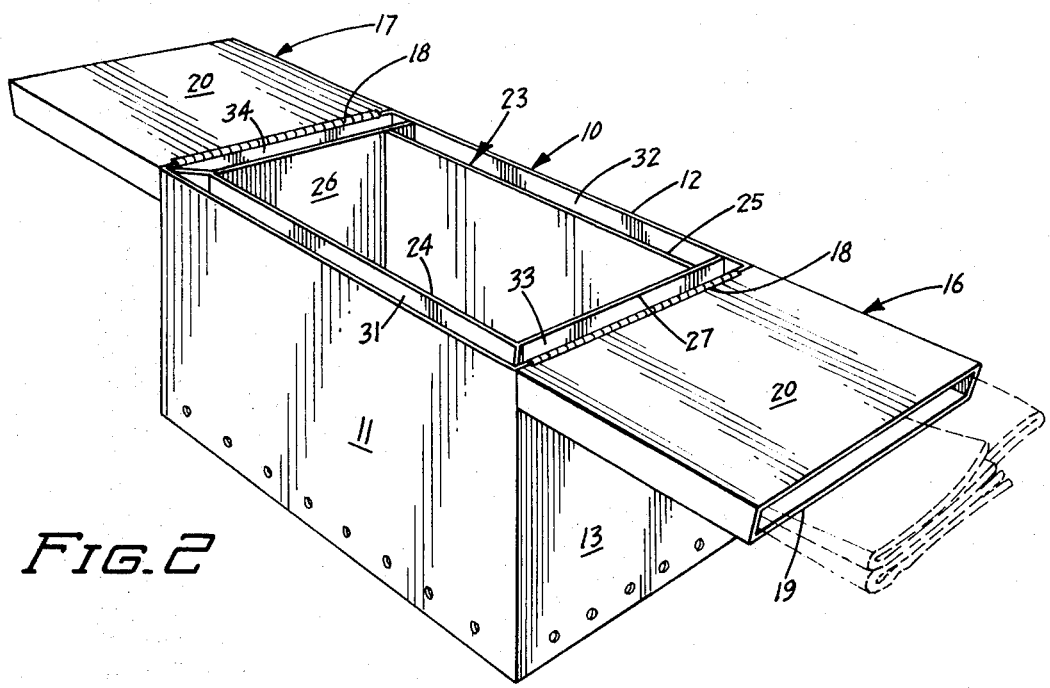
FIG. 2 is a perspective view of the same cooking unit with the cover in open position and with the telescoping storage chest removed from the firebox.
Figure 1:
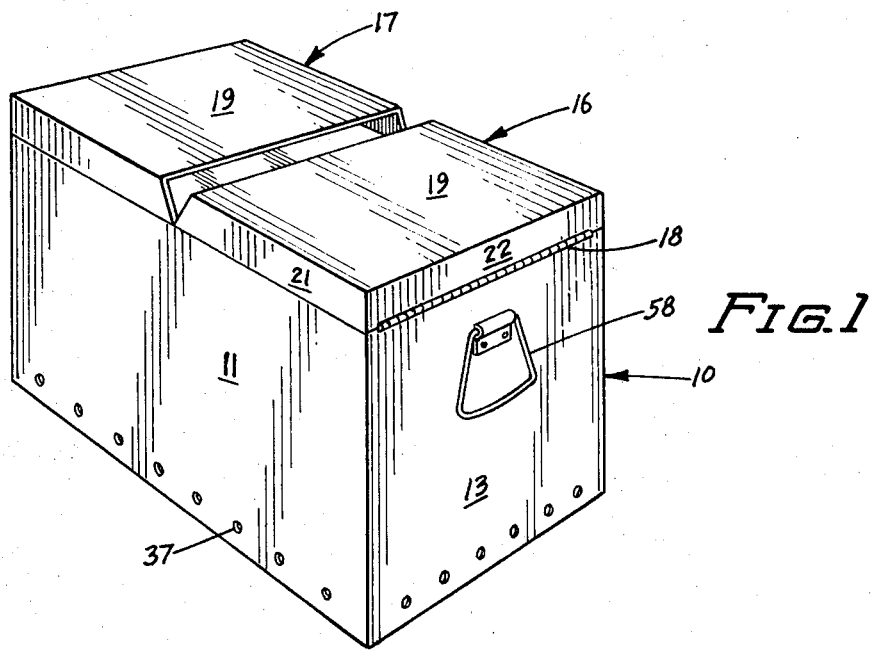
FIG. 1 is a perspective view of one form of portable cooking unit according to the present invention, shown with an optional cover in closed position.

Referring now to the drawings, and particularly to FIGS. 1 to 5, the portable cooking unit indicated generally at 10 is generally in the form of a rectangular box having an outer shell with a front wall 11, rear wall 12, end walls 13 and 14 and bottom wall 15. The bottom wall 15 is desirably set inwardly from the bottom-most edges of the front, back and end walls so as to provide an insulating air space when the portable cooking unit is setting on a flat surface.

The cooking unit is optionally provided with a cover. In the form illustrated, the cover comprises a pair of fold-out leaf members indicated generally at 16 and 17, each hinged at 18 to the top edges of end walls 13 and 14, respectively. Each of the cover members comprises spaced-apart top-bottom walls 19 and 20, sidewalls 21 and end walls 22. The end of each cover member opposite from end wall 22 is desirably left open. The cover members thus serve as a carrier and storage chamber for folded up newspaper to be used as fuel for the portable cooking unit. When the cover is closed, the end walls 22 serve as an extension of end walls 13 and 14. When the cover is opened, as shown in FIG. 2, then the end walls 22 butt against the outer end walls 13 and 14 and the cover walls 20 serve as work surfaces.

Within the outer shell there is an inner firebox shell, indicated generally at 23 and comprised of front wall 24, rear wall 25, end walls 26 and 27 and bottom wall 28. The inner front, back and end walls are spaced from their outer counterparts by means of front spacer fins 29 and rear spacer fins 30 which are extensions of the inner end walls to which the front and rear walls are attached. By this means, an insulating air space 31 is formed between the inner and outer front walls. A corresponding air space 32 is formed between the inner and outer rear walls and air spaces 33 and 34 are formed between the inner and outer end walls. Inner bottom wall 28 is spaced from outer bottom wall 15 to provide an air space 35 therebetween.

The inner firebox front, rear and sidewalls are provided with a limited number of air vent openings 36 located adjacent to the bottom wall 28. Air is drawn from the air spaces 31—34, which are open at the top, into and through the openings 36 to provide enough air to supply oxygen for combustion of the paper fuel, but without substantial propagation of flame. At the same time, the air drawn through the air spaces serves as a thermal insulator between the inner and outer firebox walls so that, although the inner walls are intensely heated, the outer walls remain relatively cool to the touch.

Optionally, a limited number of air holes or vents 37 may be provided in the front, rear and end walls of the outer shell to supply additional air. Air vents 37 are located adjacent to the bottom of the outer shell in direct communication with the air space 35 between the inner and outer bottom walls. Because combustion is controlled primarily by means of the damper effect created by the nonforaminous cover placed over the open top of the firebox, the presence of excess air inlet capacity to the bottom of the firebox does not adversely affect the desired flameless combustion cooking.

Figure 5:
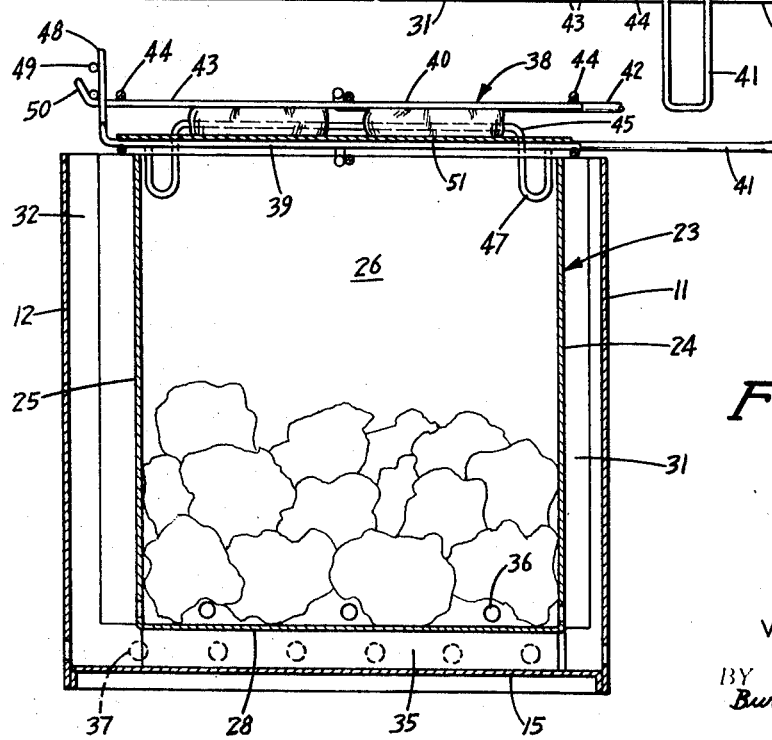
FIG. 5 is an end elevation on a slightly enlarged scale, in section.

The open top of the inner shell of the firebox supports a grill rack, indicated generally at 38, which covers a large portion of the open area. As best seen in FIG. 5, the broiler rack 38 is desirably composed of two separable parts, a lower rack portion or grate 39 and an upper rack portion or grate 40. Both are formed from heavy gauge wire bent and secured into flat open work grates or trays of generally the same configuration as the top opening of the inner shell of the firebox but slightly smaller in overall area.

Lower grate 39 has a handle 41 and upper grate 40 has a similar handle 42, each extending outwardly from the center of one side of the grates in the same direction so that both can be grasped by the handle by the individual who is cooking on the grill. Handles 41 and 42 are desirably collapsible by telescoping into the body of the grates for reducing the overall size of the grates for transport and storage. The air space 32 between the inner and outer rear walls is desirably slightly thicker than the other air spaces in order to receive the collapsed grill rack for storage and transport.

Each grate is comprised of a plurality of spaced-apart parallel wires 43 extending transversely relative to the longitudinal axis of the cooking unit and connected to longitudinal side wires or bars 44. Optionally, the ends of the lower grate 39 are turned up as at 45 to minimize danger of the food being cooked from sliding out between the rack members. The lower rack member 39 is provided with a plurality of legs 47 welded or otherwise fastened adjacent the edges of the grate. Legs 47 perform a dual function. They are positioned so as to engage the top edge of the inner firebox shell in order to position and maintain the rack assembly on the top of the firebox. The legs 47 also permit the grate to be set down when removed from the fire on the work surface 20 of the outfolded cover leaf or on a table top or on the ground when picnicking or camping, without harm to the surface and without contaminating the food held on the grate. In a typical grill, the legs may vary in length between about 1 and 3 inches.

The lower grate member 39 is also provided with one or more upwardly projecting wire loops 48 positioned on the side opposite from handle 41. The upstanding loop 48 is spanned by a plurality of parallel spaced-apart horizontal bars or rods 49 secured to the opposite legs of the loop to form a ladderlike structure. The upper grate member 40 is provided with an angularly upwardly projecting tip or lip 50 adapted to be received in and engaged by one of the openings formed by loop 48 and bars 49. The lip or tip 50 is desirably also formed as a wire loop of lesser width than loop 48 so as to be received within the latter. The combination of loop 48 and bars 49 with lip 50 forms an adjustable hinge for the broiler rack. The rack can be adjusted to receive food to be cooked, whether relatively thick or relatively thin, depending upon which of the bars 49 is engaged by the lip 50. The upper and lower rack members remain substantially parallel in any of the adjusted positions. The individual cooking on the grill can grasp the handles 41 and 42 and turn the entire broiler rack assembly with contained food without fear of the rack becoming disassembled and spilling the food.

The top surface of the lower rack 39 is covered by a nonforaminous heat-conducting metal sheet 51 covering substantially the entire surface of lower rack 39. Metal foil, such as household aluminum foil, is desirably used for this purpose because of its ready availability, low cost and disposability. The function of the metal sheet or foil 51 is to partially cover and close the top portion of the firebox to limit the entry of air and control combustion and to retain the fats and other drippings from the viands being cooked. The nonforaminous metal surface of the grill rack should desirably cover about 75 to 90 percent of the area of the open top of the inner firebox and the grill should desirably be placed on the firebox so that the uncovered areas are at opposite ends and of about equal size.

Figure 3:
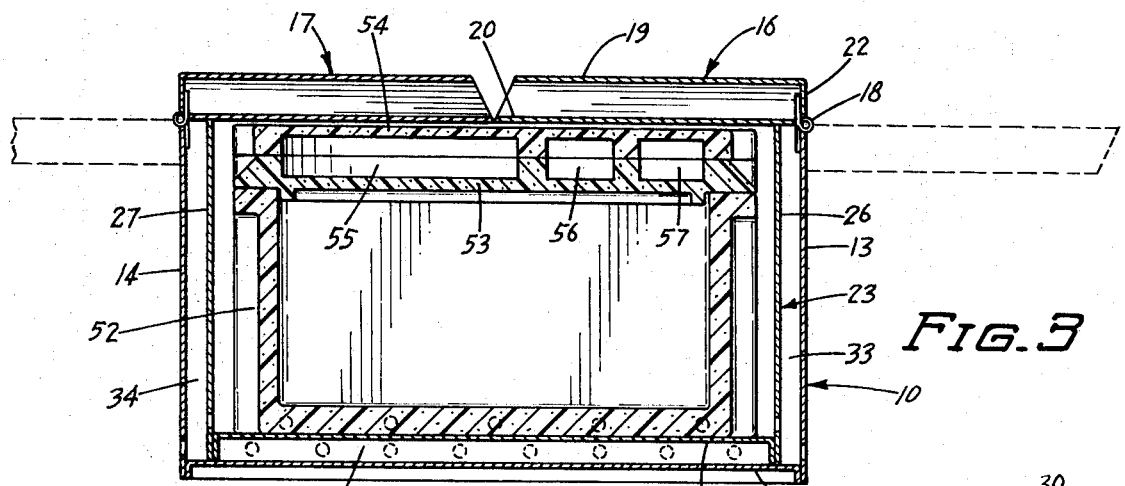
FIG. 3 is an elevation in section through the portable cooking unit of FIG. 1.
Figure 4:
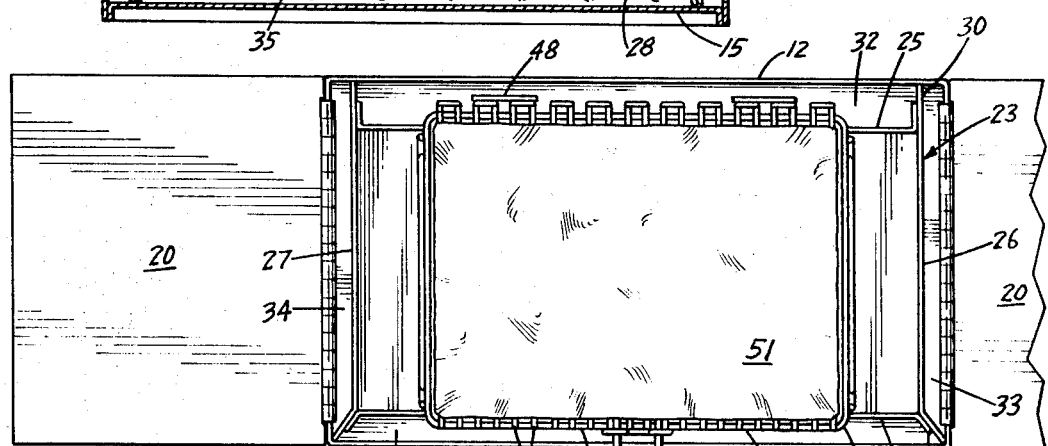
FIG. 4 is a top plan view of the cooking unit with a lower rack portion in place over the firebox.

As seen in FIG. 3, the portable cooking unit is designed for combination with an insulated chest, indicated generally at 52, for carrying purposes. Chest 52 is desirably formed from expanded plastic such as plastic foam, such as polystyrene or polyurethane foams, or the like. It may be molded or fabricated from sheets to form a box of a size and shape adapted to fit telescopically within the inner firebox portion of the grill. As illustrated, the cover of chest 52 is desirably formed in two parts 53 and 54 with recesses 55, 56, 57, etc. formed in both parts for receiving stacked picnic plates, eating utensils, condiment containers, etc. Appropriate recesses and handgrips are formed in the ends of the several parts of the chest to permit carrying and separation. The main cavity of the chest 52 is normally used for carrying food under refrigerated conditions. The opposite ends of the outer shell of the portable cooking unit are provided with appropriate handle means 58.

In use, the assembled combination portable cooking unit may be easily carried on picnics, camping trips, and the like. The food to be cooked and other commodities can be carried within the insulated chest 52. Eating utensils and the like can be carried in the chest lid. The broiler rack with handles collapsed can be carried in the air space 32. The newspaper fuel for cooking can be carried in one of the cover members 16 or 17. Upon reaching the picnic or camping site, the covers are easily opened to provide working space. The chest is easily separated from the firebox portion of the unit.

The firebox is fueled by several newspaper sheets crumpled into fairly tight balls and dropped into the firebox. The newspaper is lighted by a match only after the food to be cooked is placed on the broiler rack on top of the thin metal sheet or foil 51. As soon as the newspaper is lighted, the rack is positioned on top of the fire in order to smother the flames and inhibit further flame propagation. Heating is instantaneous and intense, but is the result of flameless combustion. Depending upon individual taste, steak, lobster, frankfurters, chops, ground meat patties, etc., can be cooked in from 5 to 10 minutes. Some people desire the so-called "charcoal" taste. This can be achieved by turning the broiler rack assembly over for direct exposure to the fire for part of the cooking time, but at the risk of formation of carcinogen substances. If it is desired to cook the food uniformly on both sides without this risk, additional foil may be placed over the food on the grill rack.

Combustion of fuel at concentrations outside of the range normally required for the propagation of flame for controlling the production of heat is well known. Charcoal cooking is essentially due to flameless combustion. The principle utilizing both solid and gaseous fuel as used in the pelletizing of ores is described in E. W. Davis U.S. Pat. No. 2,696,432 entitled "Method for Heating Solids." In the food cooking unit, according to the present invention, only solid fuel is present. It burns at a controlled rate without propagation of visible flame due to the limitation and control of oxygen due to the limitation and control of the amount of available air in the combustion zone in the firebox. The principle of flameless combustion is also utilized in other applications such as portable heating devices, cigarette lighters, gas leak detectors, and the like. The principle has not heretofore been utilized for outdoor cooking with paper fuel.

Referring now to FIGS. 6 and 7, there is shown an alternative form of firebox, indicated generally at 60. This form of firebox is single-walled and has a front wall 61, rear wall 62, end walls 63 and 64 and a bottom wall, which is not visible but is desirably set inwardly from the bottom-most edges of the front, back and end walls so as to provide an insulating air space, as already described. The top edges of end walls 63 and 64 are cut away to provide open spaces 65 and 66, respectively. The open area of the top of the firebox 60 and the combustion zone contained therein is the total of the area of the open top plus the open spaces 65 and 66 cut out of the top edges of the end walls. The combined areas of the cutaway portions 65 and 66 should equal about 10 to 25 percent of the overall open area at the top of the firebox and combustion zone. Thus, the combined areas of the cutaway portions equal about 11 to 33 percent of the top open area defined by the front, back and end walls.

As best seen in FIG. 7, this form of firebox provides the advantage that the entire top of the firebox may be covered by a rack or grate 38, as already described. This permits use of a larger rack or a smaller firebox with the same sized rack. Limited air, but ample to sustain combustion, is admitted through the open end areas 65 and 66. The top surface of lower grate 39 is covered with a nonforaminous metal sheet 51 such as aluminum foil, as already described. Optionally, a limited number of air holes or vents 67 may be provided in the front, rear and end walls adjacent the bottom to supply additional air. Such air vents sometimes facilitate initial ignition of the crumpled paper fuel but are not necessary to either initial ignition or sustained combustion of the crumpled paper fuel. The opposite ends of the firebox are desirably provided with appropriate handle means 68 for carrying. The firebox also is desirably provided with a cover (not shown) adapted to fit over the top edges of the front, back and end walls.

I claim:
1. A portable food cooking unit comprising:
   A. a relatively deep firebox adapted to be fueled with crumpled paper sheets,
   B. said firebox having a bottom, upstanding rigid substantially nonforaminous sidewalls and open top,
   C. a broiler rack fitted over the open top of said firebox,

D. said rack including at least one lower grate having a thin covering nonforaminous heat-conducting nonrigid metal surface thereon, E. said nonforaminous surface substantially covering the open area of the top of said firebox to limit entry of air to the combustion zone therein and inhibit the propagation of flame in said firebox.

2. A portable cooking unit according to claim 1 further characterized in that said nonforaminous surface covers from about 75 to 90 percent of the open area of the top of the firebox.

3. A portable cooking unit according to claim 1 further characterized in that the firebox is provided with a plurality of air vents in said sidewalls adjacent the bottom and spaced around said firebox.

4. A portable cooking unit according to claim 1 further characterized in that said firebox is double-walled with open topped insulating air spaces separating inner and outer firebox walls, one of said air spaces serving as a storage chamber for said broiler rack when not in use.

5. A portable cooking unit according to claim 1 further characterized in that an insulated chest is adapted to be fit telescopically within said firebox, said chest having a tight fitting cover.

6. A portable cooking unit according to claim 1 further characterized in that said nonforaminous heat-conducting metal surface is disposable metal foil.

7. A portable cooking unit according to claim 6 further characterized in that said metal foil is aluminum foil.